Patented July 18, 1950

2,515,239

UNITED STATES PATENT OFFICE 2,515,239

α-ACYLAMIDO-β-HYDROXY NITRO SUBSTITUTED PROPIOPHENONES

Loren M. Long, Grosse Pointe Woods, Mich., assignor to Parke, Davis & Company, Detroit, Mich., a corporation of Michigan No Drawing. Application November 15, 1948, Serial No. 60,182

7 Claims. (Cl. 260—558)

This application is a continuation-in-part of my copending application Serial No. 45,976, filed August 24, 1948, now abandoned, and the invention relates to derivatives of organic amino alcohols and to methods for obtaining the same. More particularly, the invention relates to ketonic amino alcohol compounds having the general formula,

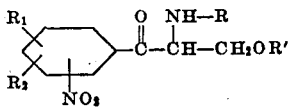

and to the production of amino diol products of formula,

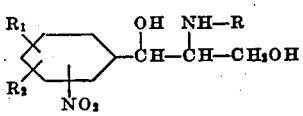

therefrom, where R is hydrogen or an acyl radical, $R_1$ and $R_2$ are the same or different and represent hydrogen, halogen, lower alkyl or lower alkoxy radicals and R' is hydrogen or an acyl radical. The term "acyl" as used herein includes lower aliphatic acyl, halogen substituted lower aliphatic acyl, benzoyl, substituted benzoyl, aralipatic acyl and the like radicals.

From inspection of the above formulae it will be readily appreciated by those skilled in the art that the acylamido-diol and the amino-diol compounds of the invention can exist in structural as well as optical isomeric forms. The term "structural" isomer or form as used herein refers to the cis or trans, that is, the planar relationship of the polar groups on the two asymmetric carbon atoms. The compounds having the cis structural configuration are those wherein the two most highly polar of the groups on the two asymmetric carbon atoms lie on the same side of the plane of the two carbon atoms. Conversely, the compounds having the trans configuration are those wherein the two most highly polar groups lie on opposite sides of the plane of the two carbon atoms. For convenience, the products having the trans structural form will hereinafter be referred to as the "pseudo" form to differentiate them from the products having the cis or "regular" structural form.

As is well known, most chemical methods for the production of organic compounds which can exist in diastereo isomeric forms lead to the formation of products containing approximately equal quantities of the two structural isomers. Where one particular diastereo isomer is desired the separation of these mixed products into their two components is many times very difficult to achieve and in all cases results in losses and increased production costs. For some inexplicable reason the hereinafter described process for the conversion of the ketonic amino alcohol compounds to the amino diol compounds of the invention results in the production of a mixture which contains a much larger quantity of the pseudo structural form of the amino diol products than of the the amino diols having the cis configuration. In general, three to four times more pseudo product is present in the mixture than the corresponding cis product and where the quantities of materials used in the process is small, the cis product can be eliminated, if desired, during the isolation of the reaction product from the reaction mixture. When large quantities of the starting materials are employed only very simple processing of the reaction mixture product is required to separate it into its components. Thus it is apparent that the avoidance of the mixture of diastereo isomers encountered as a general rule in the formation of compounds capable of existing in diastereo isomeric form is of great importance since it makes the separation of the isomeric mixture into its component parts much easier to accomplish and reduces the losses characteristic of such separations to a minimum.

Because of the difficulty of representing the structural differences in the amino diol products by graphic formulae the customary structural formulae have been used and the following convention adopted to designate the structural configuration. In those cases where the formula is that of one specific compound and no designation of its isomeric form is given, the product is the unseparated mixture of the two diastereo forms. When a designation is given the product is the particular isomer designated. On the other hand, when the formula is general, that is, includes more than one specific compound, it represents not only the mixture of the diastereo isomers but the individual isomer as well. Thus, for example, a general formula such as the second formula above represents any one of three things, the unseparated mixture of the [dl]-pseudo and [dl]-regular amino diol compounds, the individual [dl]-pseudo isomers and the individual [dl]-regular isomers.

This convention as applied to specific compounds such as [dl]-1-p-nitrophenyl-2-acetamido-propane-1,3-diol can be illustrated as follows: Where the formula shown is:

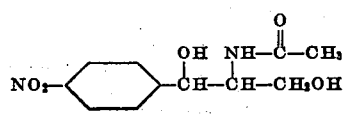

the mixture of the [dl]-pseudo and [dl]-regular isomers is meant. However, where a designation such as "[l]-ψ" appears below or to the side of the formula the product is the particular isomer, in this case, the pseudo isomer.

In accordance with the invention an ω-acyl-amidoaceto-phenone derivative containing a nitro group in the phenyl ring is condensed with formaldehyde in the presence of an alkaline condensation catalyst to obtain a ketonic compound of formula,

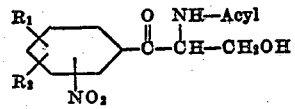

which can be converted to the corresponding [dl]-acylamido diol by reduction with an oxidizable aluminum alkoxide and the latter product, if desired, hydrolyzed to the free [dl]-amino diol. Alternatively, the [dl]-acylamido diol can be separated into the regular and pseudo diastereo isomers and each isomer hydrolyzed separately to the corresponding [dl]-regular or [dl]-pseudo amino diol. The ketonic compound can also be converted to other organic compounds such as, for example, to an acylamido acyloxy ketone of formula,

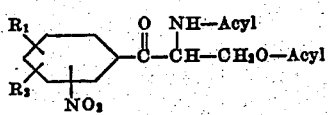

by treatment with an acylating agent. These transformations may be diagrammatically illustrated as follows:

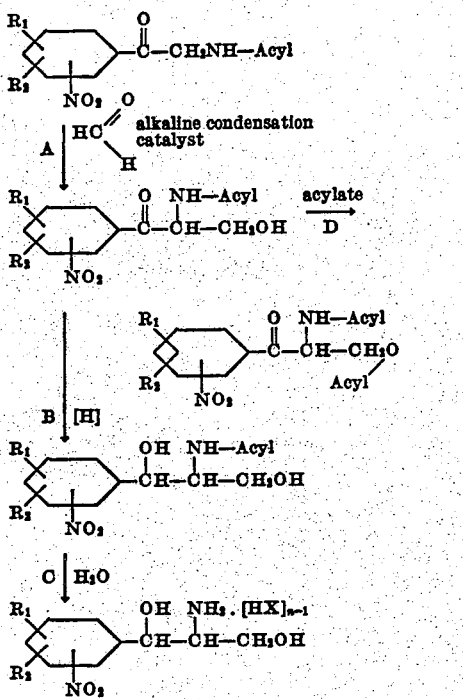

where $R_1$ and $R_2$ have the same significance as given above, HX is one equivalent of a mineral acid and $n$ is 1 or 2.

In carrying out the condensation designated as A in the above diagram the formaldehyde may be supplied to the reaction mixture in a number of different forms. For example, formaldehyde gas, aqueous or alcoholic solutions of formaldehyde, paraformaldehyde and other formaldehyde yielding polymers may be used.

The relative quantities of the two reactants can be varied within rather wide limits but it is preferable to use an excess of the formaldehyde to insure completeness of the reaction. In general, best results seem to be obtained when about 3 to 5 mols of formaldehyde per mol of the nitro substituted ω-acylamidoacetophenone are used.

A variety of solvents, alkaline condensation catalysts and reaction conditions may be employed in the condensation reaction. As solvents, water and either aqueous or anhydrous lower aliphatic alcohols are particularly advantageous but moist dialkyl ethers and dioxane-water mixtures may also be used. The alkaline condensation catalysts used in this phase of the invention may be organic bases, inorganic bases or inorganic salts of acidic or pseudo acidic organic compounds. Some representative types of these catalysts are the hydroxides, oxides, carbonates, bi-carbonates and amides of alkali or alkaline earth metals; alkali metal alkoxides; alkaline earth alkoxides; alkali metal phenolates; alkyli metal salts of lower aliphatic carboxylic acids; organic tertiary amines and quaternary ammonium hydroxides of organic tertiary amines. In general, the weakly alkaline catalysts such as sodium bicarbonate, potassium bicarbonate, calcium hydroxide, pyridine, triethylamine, N-ethyl morpholine, N,N-dimethyl aniline and the like are preferred since they make the reaction much easier to control. When strongly alkaline catalysts such as sodium hydroxide, potassium hydroxide, potassium carbonate, sodium methylate, sodium ethylate and the like are used, care must be taken to remove or inactivate the catalyst as soon as the reaction is completed in order to prevent the conversion of the desired product to the corresponding methylene bis compound by a dehydration and coupling reaction. Although the amount of the catalyst is not critical and can vary from a few hundredths or thousandths of a mol to one mol or more, it is preferable from the standpoint of yields to use only enough to being about a relatively rapid reaction. In most cases 0.05 mol or less is sufficient.

The temperature used in carrying out this methylolation reaction, as well as the time required for its completion, varies with the catalyst used. In general, the reaction can be carried out at a temperature between about 0 and 75° C. in a time varying from a few minutes to several hours. When strongly alkaline catalysts are used the reaction proceeds very rapidly and is usually complete in a few minutes at room temperature or below. However, when mildly alkaline catalysts are employed the reaction is not so rapid and usually requires from fifteen minutes to several hours at room temperature or slightly above, that is, at about 25 to 50° C.

The reduction of the α-acylamido-β-hydroxypropiophenone to the corresponding [dl]-acyl-amido diol compounds, shown by B in the above diagram, is carried out using an oxidizable aluminum alkoxide as the reductant. The reduction is carried out in an organic solvent which is usually a lower aliphatic alcohol and, preferably, the one corresponding to the alkoxide. The use of alkoxides of secondary alcohols such as of isopropanol and secondary butanol is preferred since these alkoxides are more readily oxidized and hence milder reaction conditions can be employed. Alkoxides of tertiary alcohols such as that of tertiary butyl alcohol also produce good results. In general, the reaction can be effected over a wide temperature range but for most purposes a temperature between about 20 and 125° C. has been found satisfactory. Similarly, the amount of the oxidizable aluminum alkoxide in relationship to the quantity of the ketonic compound to be reduced can be varied within rather large limits. In most cases, it is seldom necessary to employ more than about three equivalents of the alkoxide but, if desired, as little as one equivalent to as much as twenty or thirty equivalents can be used. When using an alkoxide derived from a secondary aliphatic alcohol in a solvent of the alcohol corresponding to the alkoxide, the preferred method of bringing about the reaction is to reflux the reaction mixture containing one or slightly more equivalents of the aluminum alkoxide and to distill off the oxidized alcohol [a lower aliphatic ketone] as it is formed in the reaction mixture.

In some instances it is desirable to hydrolyze the [dl]-acylamido diol products to the corresponding free [dl]-amino diols. This transformation which is illustrated by C in the above diagram can be carried out using either the purified acylamido diol mixture or the crude reaction mixture product from the reduction step as the starting material. If desired, the acylamido diol mixture can be first separated into the [dl]-ψ-acylamido diol and the [dl]-reg.-acylamido diol by recrystallization from water, aqueous alcohols or alcohols and the individual isomers hydrolyzed to the corresponding [dl]-ψ-or [dl]-reg. amino diol. The reaction can be effected with either alkaline or acidic hydrolysis catalysts or reagents. Dilute mineral acids such as dilute hydrochloric, hydrobromic, hydroiodic, phosphoric and sulfuric acids are the preferred hydrolytic agents as they are more efficient in bringing about complete hydrolysis in a shorter time with less destruction of the final product. When acidic hydrolytic reagents such as the afore-mentioned mineral acids are employed, the [dl]-1-[nitrophenyl]-2-aminopropane-1,3-diol product is present in the reaction mixture in the form of an acid addition salt and it can either be isolated as such or the salt can be neutralized and the amino diol isolated as the free base. Among the many alkaline reagents which can be used to bring about the hydrolysis are the alkali and alkaline earth metal hydroxides, oxides, carbonates, amides, alkoxides and phenolates; quaternary ammonium hydroxides and strong tertiary organic nitrogen bases.

The conversion of the α-acylamido-β-hydroxypropiophenone compounds to the corresponding β-acyloxy derivatives, shown by D in the above diagram, can be accomplished by treating the β-hydroxypropiophenone compound with an acyl halide or acyl anhydride under substantially anhydrous conditions either alone or in the presence of an acylation catalyst such as an inorganic base, an alkaline salt of an organic acid, a tertiary organic base, an aromatic sulfonic acid or sulfuric acid. The acylation can, in general, be carried out at a temperature varying from about 10 to 140° C. but the preferred temperature for the reaction is between about 60 and 120° C. An inert organic solvent such as benzene, petroleum ether, toluene and the like can be used for the reaction if desired although in most cases it is more expedient to omit the use of a solvent and to merely use an excess of the acylating agent. Some of the catalysts which can be used to bring about the reaction in a shorter period of time are sodium hydroxide, potassium hydroxide, potassium carbonate, sodium acetate, pyridine, quinoline, triethylamine, N-ethyl morpholine, N-methyl piperidine, N,N-dimethylaniline, p-toluene sulfonic acid and sulfuric acid.

The products of the invention are particularly useful in the synthesis of organic compounds possessing antibiotic activity. For example, the products produced in Examples 1, 2 and 7 can be converted to [l]-ψ-1-p-nitrophenyl-2-dichloroacetamidopropane-1,3-diol, a compound possessing outstanding and unique antibiotic properties, by the methods described in the copending application of Crooks et al. entitled "Organic Nitrogen Compounds and Methods of Obtaining Same," Serial No. 15,264, filed March 16, 1948, now Patent No. 2,483,884, isssued October 4, 1949. In addition to being useful in the preparation of antibiotics, some of the acylamido diol products prepared by the methods described above are themselves useful in the treatment of diseases. For example, the acylamido diol product of Example 7, [dl]-ψ-1-p-nitrophenyl-2-dichloro-acetamidopropane-1,3-diol, can be used in the treatment of typhus, Rocky Mountain spotted fever, various urinary infections and typhoid.

The invention is illustrated by the following examples.

*Example 1*

[a] 71 g. of p-nitro-ω-bromoacetophenone dissolved in 300 cc. of chloroform is added to a solution of 46 g. of hexamethylene tetramine in 600 cc. of chloroform. The solid product begins to separate almost immediately and the temperature of the reaction mixture rises to about 50° C. After allowing the mixture to stand for about two hours the p-nitro-ω-bromoacetophenone-hexamethylene tetramine complex is collected, washed with a little chloroform and dried. The formula of this product is:

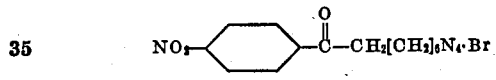

The p-nitro-ω-bromoacetophenone-hexamethylene tetramine complex prepared above is mixed with a cold solution of 500 cc. of absolute ethanol and 100 cc. of concentrated hydrochloric acid and the mixture stirred overnight at room temperature. The solid product which consists of the hydrobromide salt of p-nitro-ω-aminoacetophenone contaminated with minor amounts of the hydrochloride salt and ammonium chloride is collected, washed with 200 cc. of ice cold water to remove the ammonium chloride and dried. The formula of this compound is:

46 g. of the p-nitro-ω-aminoacetophenone hydrobromide prepared above is mixed with 200 cc. of acetic anhydride and 25 g. of sodium acetate. The mixture is stirred at room temperature and small quantities of ice and water added from time to time. Stirring is continued until the mixture becomes clear and reaches a temperature of about 70° C. The solution is diluted with 900 cc. of water, cooled to 5° C. and the p-nitro-ω-acetamidoacetophenone collected; M. P. 158°–161° C. p-Nitro-ω-acetamidoacetophenone has the formula,

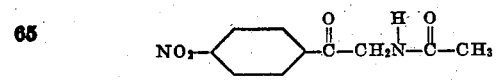

11.1 g. of p-nitro-ω-acetamidoacetophenone is mixed with 55 cc. of methanol and 17 cc. of 36—38% aqueous formaldehyde. 0.4 g. of sodium bicarbonate is added and the mixture stirred at 35° C. for about one hour and a half during which time the solid product separates. The mixture is cooled and stirred for one-half hour, the solid product collected, washed with water and dried at 60° C. The product thus obtained is p-nitro-α-acetamido-β-hydroxypropiophenone, M. P. 166–7° C., which has the formula,

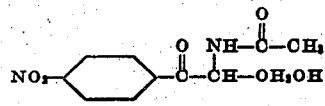

[b] 1.3 g. of p-nitro-α-acetamido-β-hydroxypropiophenone is added to 2 g. of aluminum isopropylate in 75 cc. of isopropanol at room temperature and the mixture stirred at room temperature for two days while a stream of nitrogen is passed through the solution. Most of the isopropanol is removed from the dark red-brown mixture under reduced pressure and the residue treated with 35 cc. of water. The mixture is heated to boiling, centrifuged to remove the aluminum hydroxide and the solution collected. The aluminum hydroxide is extracted with 35 cc. of hot water and the extract combined with the main reaction mixture solution. The combined extracts are cooled, filtered and the filtrate evaporated to dryness in vacuo. The residue is treated with a small amount of hot ethyl acetate and the crystalline material which fails to dissolve collected. The crystalline material which consists principally of [dl]-ψ-1-p-nitrophenyl-2-acetamidopropane-1,3-diol of formula,

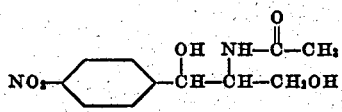

can be purified by recrystallization from ethanol or ethanol-water mixtures to remove the small quantities of [dl]-cis product; M. P. 166–8° C.

By using an equivalent amount of propionic anhydride instead of acetic anhydride in the conversion of the p-nitro-ω-aminoacetophenone to its acyl derivative, one obtains p-nitro-ω-propionamidoacetophenone which by following the processes described above can be converted to p-nitro-α-propionamido-β-hydroxypropiophenone and then to [dl]-ψ-1, p-nitrophenyl-2-propionamidopropane-1,3-diol.

[c] 3 g. of [dl]-ψ-1-p-nitrophenyl-2-acetamidopropane-1,3-diol is heated with 30 cc. of 5% hydrochloric acid on a steam bath for one-half hour. The solution is cooled, decolorized with charcoal and the decolorized solution made alkaline to pH 10–11 with sodium hydroxide solution. The free base of [dl]-ψ-1-p-nitrophenyl-2-aminopropane-1,3-diol of formula,

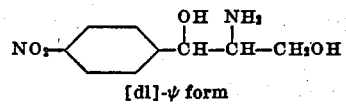

[dl]-ψ form which separates upon standing is collected, washed with cold water and dried; M. P. 140–2° C. If desired, this product can be recrystallized from water.

The hydrochloride salt of [dl]-ψ-1-p-nitrophenyl-2-aminopropane-1,3-diol can be obtained by evaporating the decolorized solution obtained after hydrolysis the [dl]-ψ-1-p-nitrophenyl-2-acetamidopropane-1,3-diol to dryness in vacuo. This salt has a melting point of 177.5–8.5° C.

[d] 2.5 g. of p-nitro-α-acetamido-β-hydroxypropiophenone is mixed with 1.5 g. of aluminum isopropylate and 25 cc. of dry isopropanol and the mixture heated under reflux for five hours. During the reflux period the acetone which is formed is distilled off and a stream of nitrogen is passed through the solution. The isopropanol is distilled from the reaction mixture under reduced pressure, the residue treated with about 50 cc. of water and the [dl]-ψ-1-p-nitrophenyl-2-acetamidopropane-1,3-diol isolated from the solution as described in [b] above.

[e] 2.5 g. of p-nitro-α-acetamido-β-hydroxypropiophenone is mixed with 1.5 g. of aluminum isopropylate and 25 cc. of dry isopropanol and the mixture heated under reflux for five hours. During the reflux period the acetone which is formed is distilled off and a stream of nitrogen is passed through the solution. The isopropanol is distilled from the reaction mixture under reduced pressure and the residue containing [dl]-ψ-1-p-nitrophenyl-2-acetamidopropane-1,3-diol treated with about 50 cc. of dilute hydrochloric acid. Sufficient strong sodium hydroxide solution is added to the solution to dissolve the aluminum hydroxide which forms upon neutralization and, after cooling, the solution is extracted with ethyl acetate. The ethyl acetate extracts are combined, dried and concentrated in vacuo to the point of crystallization. The free base of [dl]-ψ-1-p-nitrophenyl-2-aminopropane-1,3-diol which separates on cooling is collected, washed with cold water and purified, if desired, by recrystallization from water; M. P. 140–2° C.

[f] 8 g. of p-nitro-α-acetamido-β-hydroxypropiophenone is heated at about 75° C. for one-half hour with 20 cc. of acetic anhydride containing a small amount of concentrated sulfuric acid. The reaction mixture is evaporated to dryness in vacuo, the residue washed with ice water and purified by recrystallization from methanol or ethanol. The product thus obtained is p-nitro-α-acetamido-β-acetoxypropiophenone which has the formula,

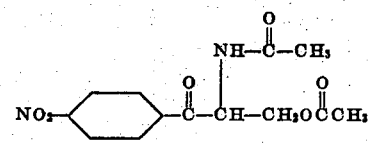

[g] 3 g. of p-nitro-α-acetamido-β-hydroxypropiophenone in 150 cc. of 5% hydrochloric acid is heated under reflux for about two to three hours. The reaction mixture is evaporated to dryness in vacuo to obtain the desired p-nitro-α-amino-β-hydroxypropiophenone hydrochloride of formula,

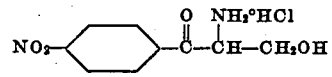

If desired, this product can be neutralized with a weakly alkaline substance to obtain the rather unstable free base.

[h] 50.6 g. of p-nitro-α-acetamido-β-hydroxypropiophenone is mixed with 41 g. of aluminum isopropylate and 600 cc. of dry isopropanol and the mixture heated under reflux for six hours. During the reflux period the acetone which is formed is distilled off and a stream of nitrogen passed through the solution. The isopropanol is distilled from the reaction mixture in vacuo and the residue treated with 750 cc. of dilute hydrochloric acid. The mixture is saturated with sodium chloride and extracted exhaustively with ethyl acetate. The ethyl acetate extracts are dried and the ethyl acetate distilled in vacuo. The residue is extracted with several fresh portions of hot ethyl acetate, the mixture cooled and the residue collected. The ethyl acetate extracts are retained for further purification. The ethyl acetate insoluble residue [M. P. 158–63° C.] which consists of a mixture of [dl]-ψ-1-p-nitrophenyl-2-acetamidopropane-1,3-diol and the corresponding [dl]-reg. isomer is recrystallized from water to obtain 21 g. of [dl]-ψ-1-p-nitrophenyl-2-acetamidopropane-1,3-diol melting at 166–7° C. The aqueous filtrate is allowed to stand for two days and the crystals which have separated collected. The crystals are [dl]-reg.-1-p-nitrophenyl-2-acetamido-1,3-diol and melt at 185° C. before recrystallization. After recrystallization these crystals melt at 195° C. and weigh 3 g.

The ethyl acetate filtrate is evaporated to dryness in vacuo and the residue treated with about 75 cc. of hot absolute ethanol. The alcohol solution is allowed to stand and the crystalline material which separates collected. This crystalline material is a mixture of the [dl]-ψ and [dl]-reg.-1-p-nitrophenyl-2-acetamidopropane-1,3-diol. In order to separate it into its two components it is recrystallized from water to obtain 3 g. of the crystalline [dl]-ψ isomer and the [dl]-reg. isomer isolated from the filtrate by allowing it to crystallize on long standing. The yield of the [dl]-reg. isomer obtained at this point is 3 g.

*Example 2*

[a] A mixture consisting of 7.1 g. of p-nitro-ω-benzamidoacetophenone, 0.2 g. of sodium bicarbonate and 1.5 g. of paraformaldehyde in 50 cc. of methanol is warmed at 45 to 50° C. for one-half hour. The reaction mixture is allowed to stand for one hour and then poured into 300–400 cc. of ice water. The precipitated product is collected, washed with water and purified by recrystallization from ethanol to obtain the pure p-nitro-α-benzamido-β-hydroxypropiophenone of formula,

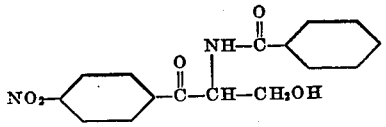

[b] A mixture consisting of 7.1 g. of p-nitro-ω-benzamidoacetophenone, 0.1 g. of sodium and 1.5 g. of paraformaldehyde in 50 cc. of methanol is allowed to stand at room temperature for about five minutes. The reaction mixture is immediately poured into 300 cc. of ice water and the desired p-nitro-α-benzamido-β-hydroxypropiophenone isolated and purified as described in [a].

[c] A mixture consisting of 7.1 g. of p-nitro-ω-benzamidoacetophenone, 0.2 g. of potassium carbonate and 3 g. of paraformaldehyde in a solvent mixture composed of 30 cc. of methanol and 10 cc. of water is stirred at room temperature for about ten minutes. The reaction mixture is poured into about 300 cc. of ice water and the crude p-nitro-α-benzamido-β-hydroxypropiophenone isolated and purified as described in [a].

[d] A mixture consisting of 7.1 g. of p-nitro-ω-benzamidoacetophenone, 0.2 g. of potassium carbonate and 3.75 g. of paraformaldehyde in 35 cc. of methanol is stirred at about 25° C. for five minutes, poured into 400 cc. of ice water and the crude p-nitro-α-benzamido-β-hydroxypropiophenone isolated and purified by recrystallization as described in [a].

[e] 6.3 g. of p-nitro-α-benzamido-β-hydroxypropiophenone is added to 4 g. of aluminum isopropylate in 75 cc. of dry isopropanol and the mixture heated under reflux for about six hours. During the refluxing period a portion of the reaction mixture is continuously distilled off and the distillate tested from time to time for acetone. The isopropanol is removed from the reaction mixture under reduced pressure and 150 cc. of water added to the residue. The mixture is heated to boiling, the aluminum hydroxide removed by filtration and the filtrated evaporated to dryness in vacuo. The residue is washed with several small portions of hot ethyl acetate and the crystalline solid which fails to dissolve collected. The crystalline solid which consists principally of [dl]-ψ-1-p-nitrophenyl-2-benzamidopropane-1,3-diol of formula,

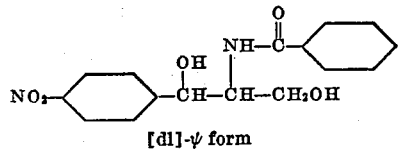

[dl]-ψ form is recrystallized from water to remove the [dl]-reg. isomer and the product collected. The [dl]-reg. isomer can be recovered, if desired, from the filtrate.

[f] 3 g. of [dl]-ψ-1-p-nitrophenyl-2-benzamidopropane-1,3-diol is heated on a steam bath for one hour with 30 cc. of 5% hydrobromic acid. The reaction mixture is decolorized with charcoal and the decolorized solution made alkaline to pH 10 with sodium hydroxide solution. The [dl]-ψ-1-p-nitrophenyl-2-aminopropane-1,3-diol of formula,

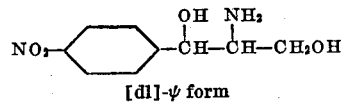

[dl]-ψ form which precipitates is collected, washed with cold water and purified, if desired, by recrystallization from water; M. P. 140–2° C.

*Example 3*

[a] 15 g. of o-methyl-p-nitro-ω-acetamidoacetophenone is mixed with 70 cc. of methanol, 10 cc. of water and 5.7 g. of paraformaldehyde. 0.5 g. of sodium bicarbonate is added and the mixture heated at 40° C. for one and a half hours. The mixture is poured in 600 cc. of ice water and the crude o-methyl-p-nitro-α-acetamido-β-hydroxypropiophenone collected and washed with water. This product which has the formula,

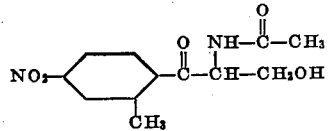

can be purified, if desired, by recrystallization from methanol.

[b] 5.32 g. of o-methyl-p-nitro-α-acetamido-β-hydroxy-propiophenone is added to 4.8 g. of aluminum sec.-butylate in 75 cc. of dry sec.-butanol and the mixture refluxed under nitrogen while distilling off a small amount of the reaction mixture. The refluxing is continued until the distillate gives a negative test for methyl ethyl ketone [about six hours] and then the sec.-butanol removed by distillation in vacuo. The residue is treated with 200 cc. of water, the mixture heated to boiling and aluminum hydroxide separated from the solution. The solution is evaporated to dryness and the residue extracted with several portions of hot ethyl acetate. The crystalline solid which fails to dissolve in the ethyl acetate is collected and dried in vacuo.

This solid which consists of a mixture which is predominately the [dl]-ψ-isomer together with minor amounts of the corresponding [dl]-reg. product is recrystallized from water to obtain the desired [dl] - ψ - 1 - [o - methyl - p - nitrophenyl-2-acetamidopropane-1,3,-diol of formula,

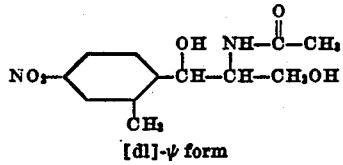
[dl]-ψ form

[c] 2 g. of [dl]-ψ-1-[o-methyl-p-nitrophenyl]-2-acetamidopropane-1,3-diol is heated on a steam bath with 20 cc. of 5% hydrochloric acid for one hour. The solution containing the [dl]-ψ-1-[o - methyl - p - nitrophenyl] - 2 - aminopropane-1,3-diol hydrochloride is cooled, decolorized with charcoal and the decolorized solution made alkaline to pH 10 with sodium hydroxide solution. The free base of [dl]-ψ-1-[o-methyl-p-nitrophenyl] - 2 - aminopropane-1,3-diol which precipitates is collected, washed with cold water and dried in vacuo. This product which has the formula,

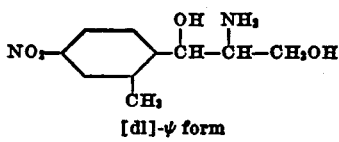
[dl]-ψ form can be purified, if desired, by recrystallization from water.

[d] A mixture consisting of 10 g. of o-methyl-p - nitro - α - acetamido - β - hydroxypropiophenone and 20 g. of benzoic anhydride is heated at 70° C. for about one-half to three-quarters of an hour. The mixture is cooled, treated with 75 cc. of water and an excess of cold sodium hydroxide solution added. After standing for a few minutes the precipitate is collected, washed well with water and purified by recrystallization from methanol or ethanol. The product thus produced is o-methyl-p-nitro-α-acetamido-β-benzoxypropiophenone of formula,

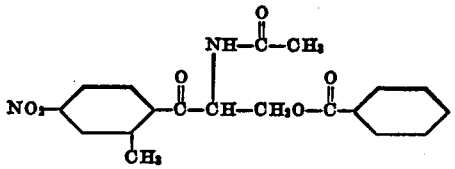

Example 4

[a] A mixture consisting of 15 g. of m-methoxy-p-nitro-ω-p'-toluylamidoacetophenone, 4.1 g. of paraformaldehyde, 0.2 g. of pyridine and 150 cc. of ethanol is warmed at 35° C. for one-half hour and then poured into 750 cc. of ice water. The crude m-methoxy-p-nitro-α-p'-toluylamido-β-hydroxypropiophenone is collected, washed with water and purified by recrystallization from ethanol. The formula of this product is,

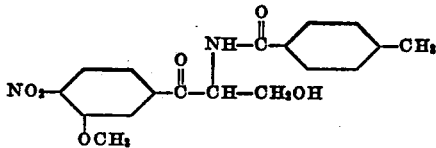

[b] 7.1 g. of m-methoxy-p-nitro-α-p'toluylamido-β-hydroxypropiophenone is added to 4 g. of aluminum isopropylate in 125 cc. of dry isopropanol and the resulting mixture refluxed under nitrogen while distilling off a small portion of the condensate. Refluxing is continued until the distillate gives a negative test for acetone and then the isopropanol removed under reduced pressure. The residue is treated with 200 cc. of hot water, the aluminum hydroxide removed by filtration and the filtrate evaporated to dryness in vacuo. The residue is washed with several portions of hot ethyl acetate and the [dl]-1 - [m - methoxy - p - nitrophenyl] - 2 - p' - toluylamidopropane-1,3-diol of formula,

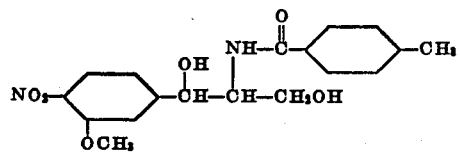

which fails to dissolve in the ethyl acetate collected. This product can be separated, by the methods hereinbefore described, into the [dl]-ψ-1 - [m - methoxy - p - nitrophenyl] - 2-p'-toluylamidopropane-1,3-diol and the corresponding [dl]-reg. isomer. As in the above examples, the mixture is composed principally of the [dl]-ψ isomer.

[c] A mixture consisting of 3 g. of [dl]-ψ-1-[m-methoxy-p-nitrophenyl]-2 - p'- toluylamidopropane-1,3-diol and 30 cc. of 5% hydrochloric acid is heated on a steam bath for about one hour and then evaporated to dryness in vacuo. The residue which consists of a mixture of p-toluic acid and the hydrochloride salt of [dl]-ψ-1-[m-methoxy-p-nitrophenyl]- 2 - aminopropane - 1,3-diol is treated with 15 cc. of water, the mixture made alkaline to pH 10 with sodium hydroxide solution and the free base of [dl]-ψ-1-[m-methoxy-p-nitrophenyl]- 2 - aminopropane - 1,3 - diol which precipitates collected. This product which has the formula,

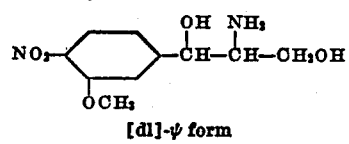
[dl]-ψ form can be purified, if desired, by recrystallization from water.

Example 5

[a] A mixture consisting of 16.3 g. of 2-nitro-4,5-dimethyl-ω-phenacetamidoacetophenone, 4.5 g. of paraformaldehyde and 0.2 g. of calcium hydroxide in 150 cc. of 95% ethanol is heated at 45° C. for about one-half hour. The reaction mixture is poured into 750 cc. of ice water and the crude 2-nitro-4,5-dimethyl-α-phenacetamido-β-hydroxypropiophenone collected. The crude product which has the formula,

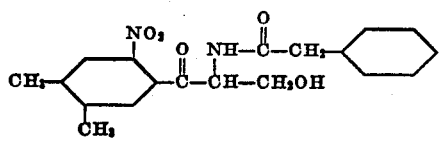

is washed with water and purified by recrystallization from ethanol.

[b] 7.1 g. of 2-nitro-4,5-dimethyl-α-phenacetamido-β-hydroxypropiophenone is added to 4.5 g. of aluminum isopropylate in 150 cc. of dry isopropanol and the mixture refluxed under nitrogen for about five hours during which time a small amount of the reaction mixture is continuously removed by distillation. After the reduction is completed, the isopropanol is removed by distillation in vacuo. The residue containing [dl]-1-[2'-nitro-4',5'-dimethylphenyl] - 2 - phenylacetamidopropane-1,3-diol is treated with 100 cc. of water and the mixture acidified with hydrochloric acid. Sufficient warm 10 N sodium hydroxide solution to dissolve the aluminum hydroxide which separates on neutralization is added and, after cooling, the solution extracted with ethyl acetate. The combined ethyl acetate extracts are dried and then concentrated to the point of crystallization. The [dl]-1-[2'-nitro-4',5'-dimethylphenyl]-2-aminopropane-1,3-diol of formula,

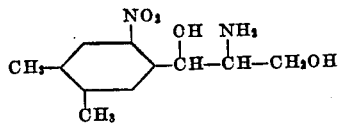

which separates from the solution on cooling is collected and dried in vacuo. If desired, this product can be recrystallized from water or alcohol to obtain the individual diastereo isomers of the amino diol.

*Example 6*

[a] A mixture consisting of 18 g. of 3-nitro-5-chloro-ω-[α-chloropropionamido] acetophenone, 6 g. of paraformaldehyde and 0.2 g. of sodium carbonate in 200 cc. of 70% aqueous methanol is stirred at room temperature for about one hour and then poured into 500 cc. of ice water. The precipitated product is collected, washed with water and purified by recrystallization from methanol or ethanol. The compound thus obtained is 3-nitro-5-chloro-α-[α'-chloropropionamido]-β-hydroxypropiophenone of formula,

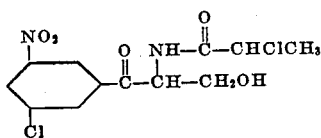

[b] 9.4 g. of 3-nitro-5-chloro-α-[α'-chloropropionamido]-β-hydroxypropiophenone is added to 6 g. of aluminum isopropylate in 250 cc. of dry isopropanol and the mixture heated at 50° C. for about twenty-four hours during which time a stream of nitrogen is passed through the solution. The isopropanol is removed by distillation in vacuo and the residue treated with about 200 cc. of water. The mixture is warmed to insure complete precipitation of the aluminum hydroxide, the aluminum hydroxide removed by filtration and the filtrate evaporated to dryness in vacuo. The residue is washed with several portions of hot ethyl acetate and the material which fails to dissolve collected. The solid is recrystallized from water to obtain the desired [dl]-ψ-1-[3'-nitro-5'-chlorophenyl]-2-α - chloropropionamidopropane-1,3-diol of formula,

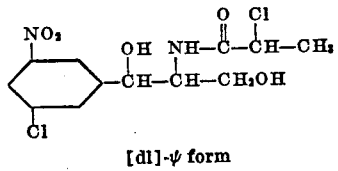

[dl]-ψ form

The aqueous filtrate is allowed to stand and the [dl]-reg. isomer which separates collected and purified by recrystallization. Further quantities of both isomers can be obtained from the ethyl acetate filtrate by the methods described in Example 1 [g].

[c] A mixure consisting of 3 g. of [dl]-ψ-1-[3'-nitro-5'-chlorophenyl]-2 - α - chloropropionamidopropane-1,3-diol and 30 cc. of 5% hydriodic acid is warmed on a steam bath for one-half hour. The solution is decolorized with charcoal and the decolorized solution made alkaline to pH 10 with sodium hydroxide solution. The free base of [dl]-ψ-1-[3'-nitro-5'-chlorophenyl] - 2 - aminopropane-1,3-diol of formula,

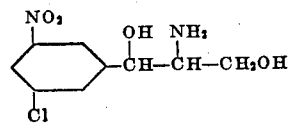

[dl]-ψ form which precipitates is collected and purified, if desired, by recrystallization from water.

*Example 7*

[a] A mixture consisting of 29 g. of p-nitro-ω-dichloroacetamidoacetophenone, 150 cc. of methanol, 50 cc. of 38% aqueous formaldehyde and 0.5 g. of sodium bicarbonate is heated at 35° C. for one and a half hours. The reaction mixture is cooled, the solid product collected and washed with water. The crude p-nitro-α-dichloroacetamido-β-hydroxypropiophenone thus obtained is purified by recrystallization from ethanol or methanol. The formula of this product is,

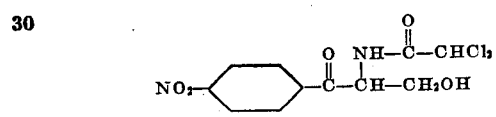

[b] 16 g. of p-nitro-α-dichloroacetamido-β-hydroxypropiophenone is added to 10 g. of aluminum isopropylate in 250 cc. of dry isopropanol and the mixture refluxed for six hours. During the heating period a stream of nitrogen is passed through the solution and a small amount of the reaction mixture is continuously distilled off. The isopropanol is removed by distillation in vacuo, the residue treated with 250 cc. of water and the mixture heated to boiling. The aluminum hydroxide is removed by filtration and the filtrate evaporated to dryness in vacuo. The residue is washed with several small portions of ethyl acetate and the crystalline solid containing [dl]-ψ-1-p-nitrophenyl-2-dichloroactamidopropane-1,3-diol which fails to dissolve collected and recrystallized from water to obtain the desired [dl]-ψ-isomer. This product which has the formula,

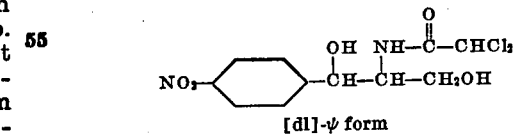

[dl]-ψ form can be recrystallized, if desired, from ethylene dichloride.

[c] 5 g. of [dl]-ψ-1-p-nitrophenyl-2-dichloroacetamidopropane-1,3-diol is heated on a steam bath with 50 cc. of 5% sulfuric acid for about fifteen minutes. The mixture is decolorized with charcoal, made alkaline to pH 10 to neutralize the sulfuric acid salt of the desired amino diol and the precipitated product collected. This product which is [dl]-ψ-1-p-nitrophenyl-2-aminopropane-1,3-diol of formula,

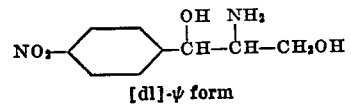

[dl]-ψ form can be purified by recrystallization from water; M. P. 140–2° C.

The ω-acylamidoacetophenone derivatives used as starting materials in the practice of the invention may be prepared as described in my copending application, Serial No. 45,975, filed August 24, 1948, entitled "Nitrogen Containing Ketones and Methods for Obtaining the Same." The process described in said application involves hydrolyzing a nitro-ω-haloacetophenone-hexamethylene tetramine complex to the corresponding nitro-ω-aminoacetophenone and acylating the amino ketone with a suitable acylating agent. A specific example of the preparation of p-nitro-ω-acetamidoacetophenone by this process is shown in Example 1 [a] above.

Some of the subject matter disclosed but not claimed herein is disclosed and claimed in my copending applications Serial Nos. 106,731; 106,732 and 106,733, all filed on July 25, 1949.

What I claim is:

1. A compound of the formula,

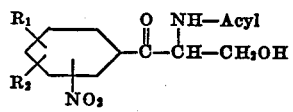

where R₁ and R₂ are members of the class consisting of hydrogen, halogen, lower alkyl and lower alkoxy radicals, said Acyl being a carboxylic acid acyl radical.

2. A compound of the formula,

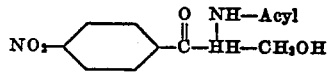

said Acyl being a carboxylic acid acyl radical.

3. A compound of the formula,

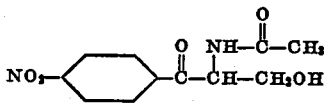

4. A compound of the formula,

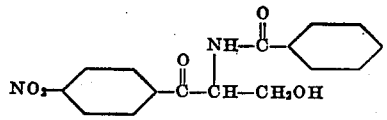

5. A compound of the formula,

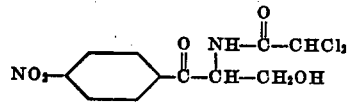

6. Process which comprises condensing a compound of formula,

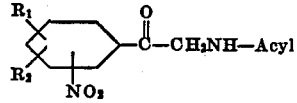

with formaldehyde in the presence of an alkaline condensation catalyst to obtain a ketonic compound of formula,

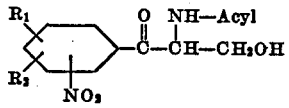

where R₁ and R₂ are members of the class consisting of hydrogen, halogen, lower alkyl and lower alkoxy radicals, said Acyl being a carboxylic acid acyl radical.

7. Process which comprises condensing a compound of formula,

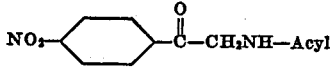

with formaldehyde in the presence of an alkaline condensation catalyst to obtain a ketonic compound of formula,

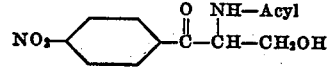

where Acyl is a carboxylic acid acyl radical.

LOREN M. LONG.

No references cited.